US006937136B2

(12) United States Patent
Greenwood et al.

(10) Patent No.: US 6,937,136 B2
(45) Date of Patent: Aug. 30, 2005

(54) SECURITY SYSTEM

(75) Inventors: Jeremy John Greenwood, Sutton Coldfield (GB); Kevin Trevor Talbot, Lichfield (GB); Christopher Richard Bottomley, Coventry (GB)

(73) Assignee: Land Rover, Warwick (GB)

( * ) Notice: Subject to any disclaimer, the term of this patent is extended or adjusted under 35 U.S.C. 154(b) by 597 days.

(21) Appl. No.: 09/954,765

(22) Filed: Sep. 18, 2001

(65) Prior Publication Data

US 2002/0033752 A1 Mar. 21, 2002

(30) Foreign Application Priority Data

Sep. 19, 2000 (GB) ............................................ 0022940
Mar. 2, 2001 (GB) ............................................ 0105160

(51) Int. Cl.[7] ................................................ G08C 19/00
(52) U.S. Cl. ...................................................... 340/5.61
(58) Field of Search .............................. 340/5.61, 5.62, 340/5.63, 5.64, 10.1; 307/10.5

(56) References Cited

U.S. PATENT DOCUMENTS 4,654,658 A * 3/1987 Walton ...................... 340/10.4
4,973,958 A 11/1990 Hirano et al. .......... 340/825.69
5,499,022 A * 3/1996 Boschini .................... 340/5.62
5,600,323 A 2/1997 Boschini ..................... 341/173
5,696,485 A * 12/1997 Treharne .................... 340/505
5,940,003 A 8/1999 Schulz .................. 340/825.31
6,208,239 B1 * 3/2001 Muller et al. .......... 340/426.35
6,218,932 B1 4/2001 Stippler ...................... 340/426
6,239,724 B1 * 5/2001 Doron et al. .......... 340/870.28
6,396,438 B1 * 5/2002 Seal ........................... 342/127
6,538,560 B1 * 3/2003 Stobbe et al. .............. 340/5.72
6,552,649 B1 * 4/2003 Okada et al. .............. 340/5.61

FOREIGN PATENT DOCUMENTS

| | | | | |
|---|---|---|---|---|
| DE | 197 12 911 | A1 | 10/1998 | ........... G01R/33/02 |
| DE | 197 18 423 | A1 | 11/1998 | ............ H01Q/7/00 |
| DE | 198 36 957 | C1 | 9/1999 | ........... B60R/25/00 |
| DE | 198 45 649 | A1 | 4/2000 | ........... B60R/25/00 |
| EP | 0 783 190 | A1 | 1/1997 | .......... H01Q/21/28 |
| EP | 0 783 190 | A1 | 7/1997 | .......... H01Q/21/28 |
| EP | 0 999 102 | A2 | 5/2000 | |
| GB | 2 326 769 | A | 12/1998 | .......... H01Q/21/28 |
| GB | 2 331 671 | A | 5/1999 | |
| GB | 2 332 548 | A | 6/1999 | ........... B60R/25/00 |
| WO | 99/58794 | | 11/1999 | ........... E05B/49/00 |

* cited by examiner

*Primary Examiner*—Edwin C. Holloway, III
(74) *Attorney, Agent, or Firm*—Davis & Bujold, P.L.L.C.

(57) ABSTRACT

A security system is disclosed which is suitable for use in a passive entry and passive starting arrangement for a vehicle 10. A set of transmitters in the form of coils A, B, C are spaced around the vehicle 10, one A, B in each door mirror 20R, 20L and one in a high level brake light 16 at the rear end.

Operation of a door handle initiates an access challenge from the vehicle 10 which is sent out successively on a plurality of the coils A, B, C. A portable transponder 26 carried by an authorised user is adapted to pick up the challenge signal and send back to a security controller 18 a response signal in which is included vector information relating to the relative positioning between the vehicle 10 and the transponder 26.

21 Claims, 6 Drawing Sheets

Typical Response to Operation from Door.

Typical Response to Operation from Engine Start Button.

SECURITY SYSTEM

FIELD OF THE INVENTION

This invention relates to security systems. It is particularly applicable to vehicle security systems, but also to other security systems such as those for buildings.

BACKGROUND TO THE INVENTION

Passive entry and passive starting systems are known for vehicles and allow a user to gain entry to a vehicle by simply operating a door handle and to remobilize passively and start an engine or other subsystem of the vehicle, e.g. by pressing a button. All this can be achieved by a user simply carrying a transponder about their person.

A system of this type might work, on detection of door handle operation, by sending a challenge to a remote transponder using a low frequency signal, e.g. 125 kHz. The transponder might then respond with an encrypted reply on a higher frequency, e.g. 433 MHz The low frequency (LF) signal may be sent from coils located near the front doors and boot and further coils may be installed in the interior of the vehicle so as to establish when the transponder is inside the vehicle to facilitate engine starting. This general type of passive entry and starting system is discussed in, for example, U.S. Pat. No. 4,973,958 and in EP 0783190.

It is a problem with some prior art security systems that a criminal can employ transmitter-receiver pairs with a two-way link between the vehicle and its owner. The criminal may succeed in gaining access to the car, even though the authorising transponder is not in his possession or even within range of the vehicle. One arrangement which provides protection against such so-called relay hackers is disclosed in our co-pending application GB 2332548.

There are other problems associated in particular with the "passive start" of a passive entry and passive enable/start arrangement. If, for example, detectors for passive starting rely on distance attenuation to determine whether a user is in the immediate locality of the drivers seat, it might prove difficult, due to the variability and shape of the magnetic fields, to guarantee completely reliable operation. For example a user carrying the transponder might be leaning against a driver's window while a child is standing on the driver's seat and this might cause the system to mistakenly determine that the conditions for enabling the starter switch had been satisfied.

SUMMARY OF THE INVENTION

Accordingly, the invention provides a security system for a protected object, the system comprising a security controller and a plurality of signal transmitters associated with the protected object, and a portable transponder, wherein the transmitters are arranged in use to transmit a challenge signal, the transponder is arranged to receive the challenge signal from said transmitters and to transmit in response thereto a response signal which includes a vector quantity, the transponder is further arranged to measure vector information relating to the vector quantity, and to vary its response depending on vector information, and the controller defines predetermined criteria and is arranged to determine from the response of the transponder whether the vector information meets said criteria, and to perform a security function only if the criteria are met.

Preferably the vector information relates to the direction of a field, such as a magnetic field, which forms at least part of the challenge signal. The vector information may therefore comprise at least one component of a vector quantity of the challenge signal, and preferably comprises three components which are, most conveniently, mutually perpendicular.

Preferably the vector information comprises the relative directions of at least a component of the signals from the respective transmitters This has the advantage that the relative directions are not affected by the orientation of the transponder relative to the protected object Preferably the vector information comprises the relative strengths of at least a component of the signals from the respective transmitters.

The transponder may be arranged to relay said vector information to the security controller, and the security controller arranged to determine from the vector information whether the criteria are met.

Alternatively the transponder may be arranged to determine from the vector information whether the criteria are met, and to vary its response depending on whether they are. This may be by only responding of the criteria are met, or by sending a response which indicates if a challenge is received of which the vector information does not meet the criteria.

Preferably the vector information is indicative of the position of the transponder relative to the protected object, and the criteria comprise the vector information being consistent with the transponder being positioned in a predetermined relationship to said protected object.

For example, the security controller may be arranged to carry out a comparison between said vector information and a vector map of an area associated with the protected object, the map containing the vector information consistent with the transponder being at various positions within the area.

The transmitters may be arranged in groups, each group comprising at least two transmitters located substantially together in different, preferably mutually orthogonal, orientations.

The challenge signal may comprise a plurality of components from different transmitters, and the relative strengths of the components within the signal arranged to vary with time during transmission of the challenge signal. In this case the criteria can comprise the vector information varying in a way consistent with the varying in relative strength of said components. This arrangement increases security because a hacker would need to be able to detect the changes of direction of the field and transmit the relevant information back to the controller in the required format.

The transponder preferably comprises a plurality of sensors, such as inductive coils or Hall effect transducers, arranged to detect different components of the challenge signal, which are preferably substantially mutually orthogonal.

Preferably the transponder further comprises a calibration transmitter arranged to transmit a signal at a known orientation relative to said sensors so as to enable calibration of the sensors.

The object may be a vehicle, in which case the security function may comprise allowing access to the vehicle.

Preferably the system further comprises a plurality of sensors each associated with a respective closure of the vehicle, such as a door or boot lid, the security controller is arranged to issue the challenge signal in response to an attempt by a user to open one of the closures, and the criteria vary depending on which closure the user is attempting to open.

Alternatively the security function may comprise enabling the vehicle to start, in which case the criteria preferably comprise the vector information being consistent with the transponder being inside the vehicle.

Preferably the challenge signals are transmitted as magnetic fields which oscillate at a carrier frequency which is low enough for the area in which the transponder is expected to operate to be significantly less than one wavelength of the challenge signals if they were transmitted as electromagnetic radiation. If this is the case, the fields produced by the challenge signals can be considered as simple magnetic fields and any changes in the field within the area of interest will be substantially in phase with the changes at the transmitter coils. For a vehicle security system this means that the frequency is preferably below about 10 MHz, and more preferably below about 1 MHz.

The response signal can be transmitted at any suitable frequency, such as 13.56 MHz or 434 MHz.

Preferred embodiments of the invention will now be described by way of example only and with reference to the accompanying drawings.

DETAILED DESCRIPTION OF THE PREFERRED EMBODIMENTS

Figure 1:
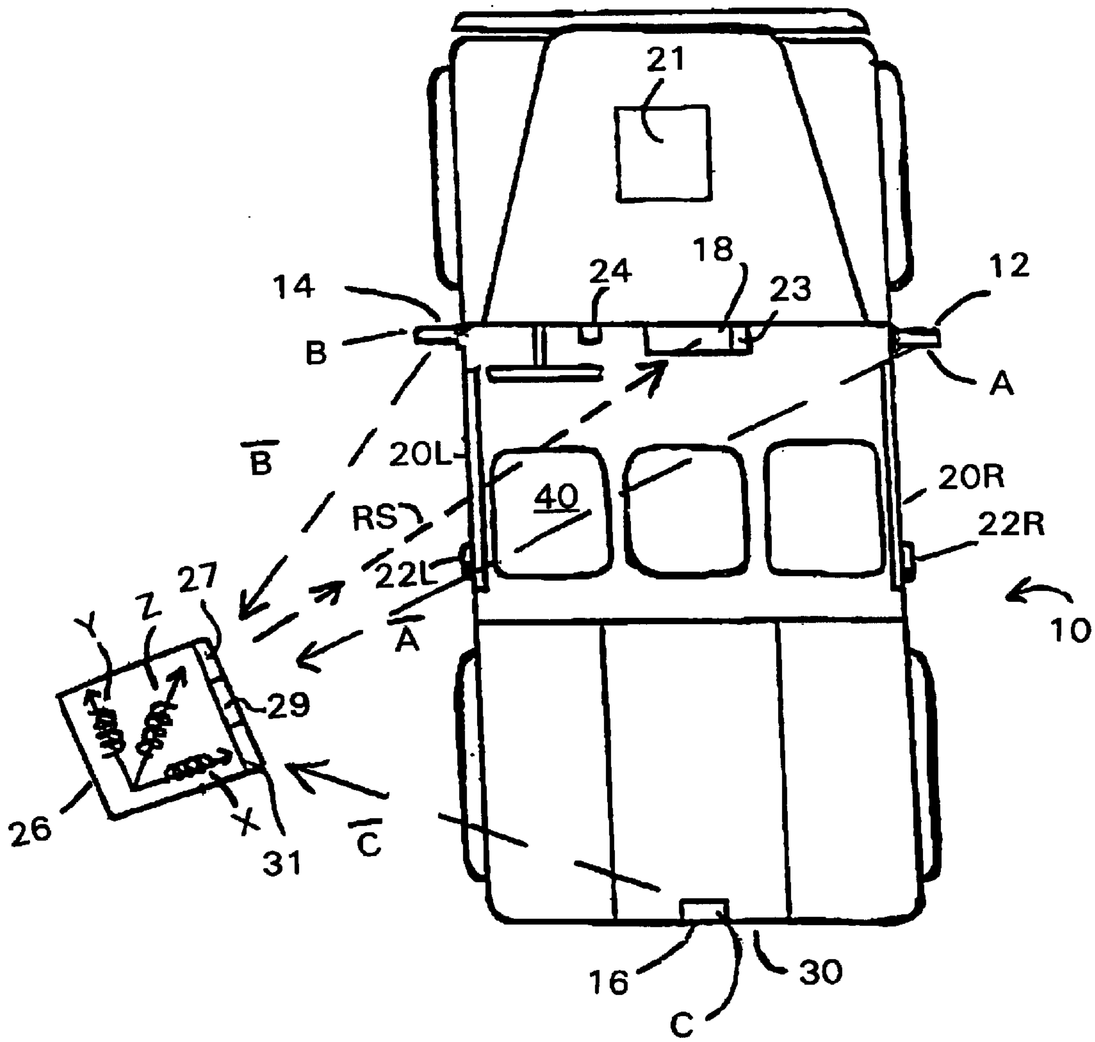
FIG. 1 is a schematic diagram of a vehicle including a security system according to the invention.

Referring to the figures, a vehicle 10 comprises three transmitters in the form of coils A, B, C spaced around it. The coils A, B, C are located one each A, B in opposing wing mirror assemblies 12, 14 and one C in a high level brake light assembly 16 at the rear end of the vehicle 10.

The vehicle further comprises a security controller 18 which has control over vehicle access through a set of doors 20L, 20R and also has control over starting the vehicle engine 21. The security system for controlling vehicle access and vehicle starting is in the form of so-called "passive entry/passive start" system. This involves the controller 18 sending out a challenge signal using coils A, B, C upon detection of an access request such as the operation of a door handle 22L, 22R. If the challenge signal is legitimately responded to with a valid and plausible response signal, which is received by a receiver 23 in the control unit 18, the doors unlatch to allow access. In similar fashion, engine starting is also passively enabled upon pressing a starter button 24.

The challenge signal is sent out initially using the coil B nearest to the door handle 22L which has been operated or, if it is passive starting which is being attempted, by the coil B nearest to the starter switch. The challenge signal is then sent out again sequentially on at least one of the other coils A, C, the signal from each coil A, B, C being uniquely identified with the location 12, 14, 16 of that coil A, B, C.

The response signal RS, if any, to the challenge signal is provided by a portable transponder 26 which is adapted to be carried by an authorised user of the vehicle 10. The transponder 26 includes three substantially orthogonal coils X, Y, Z. These are connected via analogue switches to a single low frequency (LF) receiver, although it will be apparent that in another embodiment it would be possible to connect them instead to three LF receivers without using analogue switches.

Figure 2:
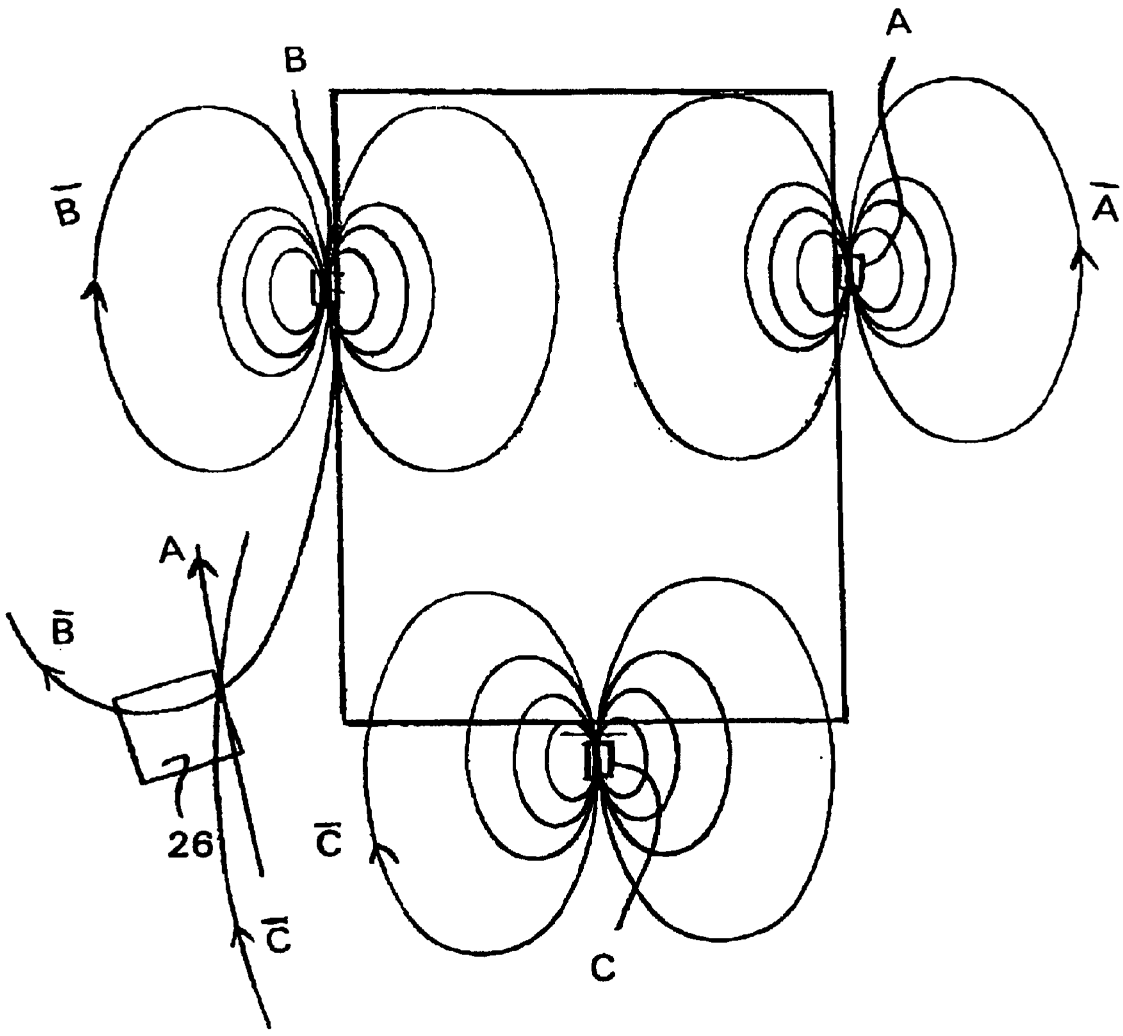
FIG. 2 is a diagram showing the magnetic field produced by the system of FIG. 1, FIGS. 3*a*, 3*b*, 3*c*, and 3*d* show the effect of phase relationships on the addition of fields from two transmitters of the system of FIG. 1.

Referring to FIG. 2, because of the relatively low frequency of the challenge signal, which in this example has a nominal carrier frequency of 125 kHz, for all relevant positions of the transponder 26 near the vehicle, the field produced by the coils A, B, C will behave in the near field manner. This means that it can be considered as an oscillating magnetic field, the magnitude and direction of which will be as shown by the lines of flux in FIG. 2. The magnitude of the field strength will vary substantially sinusoidally, giving two changes of field direction with each cycle. The strength of the field from each coil A, B, C falls off in an approximately cube root relationship with distance from the respective coil. It will be appreciated that for any given position around the vehicle 10, there will be a fixed relationship between the directions and magnitudes of the magnetic field signals from the three coils A, B, C. However, this relationship will vary in a quite complex manner because the direction of the fields varies not only with the relative direction of the point of measurement from the coil, but also with the distance between the point of measurement and the coil.

Therefore in order to use the vector information regarding the fields, it is necessary to produce a map of the area around the vehicle having, for each position, stored values for the relative directions and strengths of the fields from the three coils A, B, C. This gives unique values for each position so that the position of the transponder 26 can be identified from the signals it receives.

The signal levels from each of the three transponder coils X, Y, Z are measured and are processed to give the three orthogonal components of the field vector $\overline{A}$, $\overline{B}$, $\overline{C}$, of the challenge signal coming in from each of the coils A, B, C. The vector information for each of the transmitter coils A, B, C is sent back to the security controller 18 as an encrypted response signal, which can either be in the form of an angle and magnitude, or in the form of the components e.g. $x_b$, $y_b$, $z_b$ in which each component indicates the signal levels detected in the transponder coils X, Y, Z from the vector of the signal coming in from the vehicle coil B in question. It should be noted that in order to determine the sign of each component, that is to assign a positive or negative value to it, the timing of the measurement of the three components needs to be coordinated so that phase relationship can determined. Then one of the components $x_b$, $y_b$, $z_b$ is defined as positive, e.g. $x_b$, and then the other components $y_b$, $z_b$ are designated as positive or negative depending on whether the signals detected by the coils Y and Z are in phase or in antiphase with that detected by coil X. The three components of the signals for each of the three coils A, B, C are sent back by the transponder to the controller 18 which can then use them to determine the position of the transponder as will be described in more detail below.

The format of the challenge and response signals is as follows. Firstly the challenge signal includes at least an element which is random, i.e. Challenge Signal=Random Challenge The response signal is encrypted and includes the random challenge signal, or the random element from it, and the three components of the signals from each of the three coils A, B, C, i.e.

Response Signal RS=Encrypted (random challenge+vector information)

The encryption is preferable a symmetrical algorithm having the or each encryption key stored in both the transponder 26 and in the security controller 18. The response signal is transmitted in RF, in this example at 434 MHz, and is decrypted by the security controller 18 to check that the encrypted challenge in the response signal RS matches the transmitted challenge signal and, if so, the transponder 26 is authenticated.

It will be appreciated that the direction of the field of the signal from one of the coils A, B or C as measured by the transponder will depend not only on the relative positions of the vehicle and the transponder, but also on the orientation of the transponder in order to eliminate the effects of the orientation of the transponder it is necessary to measure the relative directions of pairs of the coils A, B, C as measured from the transponder. The controller therefore first determines the angles of the fields for each of the three signals, e.g.

$\Phi_A = f(x_A, y_A, z_A,)$ similarly for $B$ and $C$

It then measures the difference between the angles of each pair of coils A and B,
A and C, and B and C i.e.

$\Phi_{AB} = \Phi_A - \Phi_B,\ \Phi_{AC} = \Phi_A - \Phi_C,\ \Phi_{BC} = \Phi_B - \Phi_C.$

These relative angles are independent of the orientation of the transponder.

The security controller 18 uses the vector information to determine the position of the transponder 26 in relation to the vehicle 10, by comparing the relative angles with a vector map of the area around the vehicle.

In the simplest case only the relative angles of the field vectors A, B, C are used to compare with the vector map. However the three components $x_a$, $y_a$, $z_a$, of the vector for coil A also indicate the magnitude of the field vector for the signal from coil A, and likewise the components of the signals from coils B and C. The absolute magnitudes would be variable depending on a number of factors, but the relative magnitudes of the signals from the three coils A, B, C could be measured and included in the vector map to give further information on the position of the transponder.

Figure 3A:
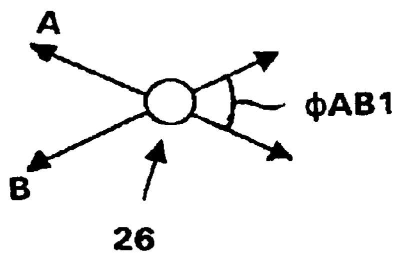
Figure 3B:
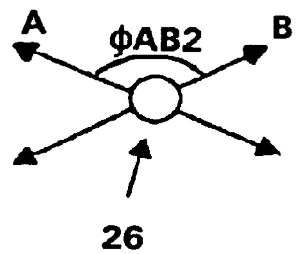
Figure 3C:
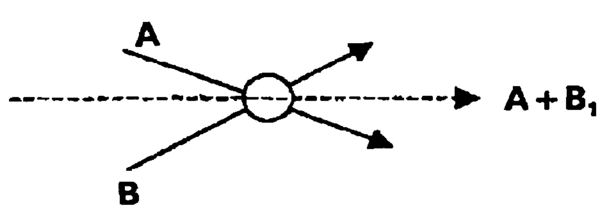
Figure 3D:
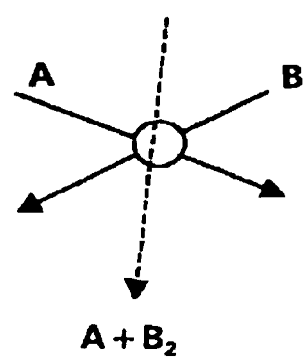

In some cases sensors may be used in the transponder which cannot measure the phase information of the field vectors in the detected signals. Referring to FIGS. 3*a* and 3*b*, this produces a degree of ambiguity in the relative angles of two of the filed vectors A and B. If, as shown, field A is oscillating along the direction of arrow A and field B is oscillating along the direction of arrow B, then the angle between the vectors could be $\Phi_{AB1}$ as shown in FIG. 3*a*, or $\Phi_{AB2}$ as shown in FIG. 3*b*. In order to resolve this, the signals A and B are transmitted both individually, and together. For example the controller 18 may produce a signal from coil A, then one simultaneously from A and B, and then one solely from B. Referring to FIGS. 3*c* and 3*d*, if the angle between the two field vectors is acute, that is less than 90°, as shown in FIG. 3*c*, then the combined vector $\overline{A+B_1}$ will be larger than if the angle between the two vectors is obtuse, that is greater than 90°, as shown in FIG. 3*d* as $\overline{A+B_2}$.

As a means of confirming the relative angles it may be preferred to reverse the phase on one of the coils A, B and produce a second combined signal $\overline{A-B}$. This will enable a comparison between the vector sums of the two combined signals to determine which has the greater magnitude.

In an alternative embodiment, the transponder 26 could include the logic means necessary to determine internally its position with respect to the vehicle 10 and merely relay this information back to the security controller 18. The transponder 26 may include sufficient processing ability to enable it to determine from the signals it detects whether it is in a position consistent with being in the possession of a person opening a door or boot of the vehicle In this case it will only send a response signal if that condition is met.

The security controller 18 also includes in that plausibility check any additional information it may have about the transponder's likely location. For example, if the challenge signal was initiated by operating a particular door handle 22L, the security controller 18 can assume that, for the response signal RS to pass the plausibility test, the vector information it 18 receives as a response signal RS should put the transponder 26 in the region of the vector map nearest to that door 20L.

In practice, more vehicle coils may be preferred, in order to reduce the range required from each vehicle coil A, B, C.

Figure 4:
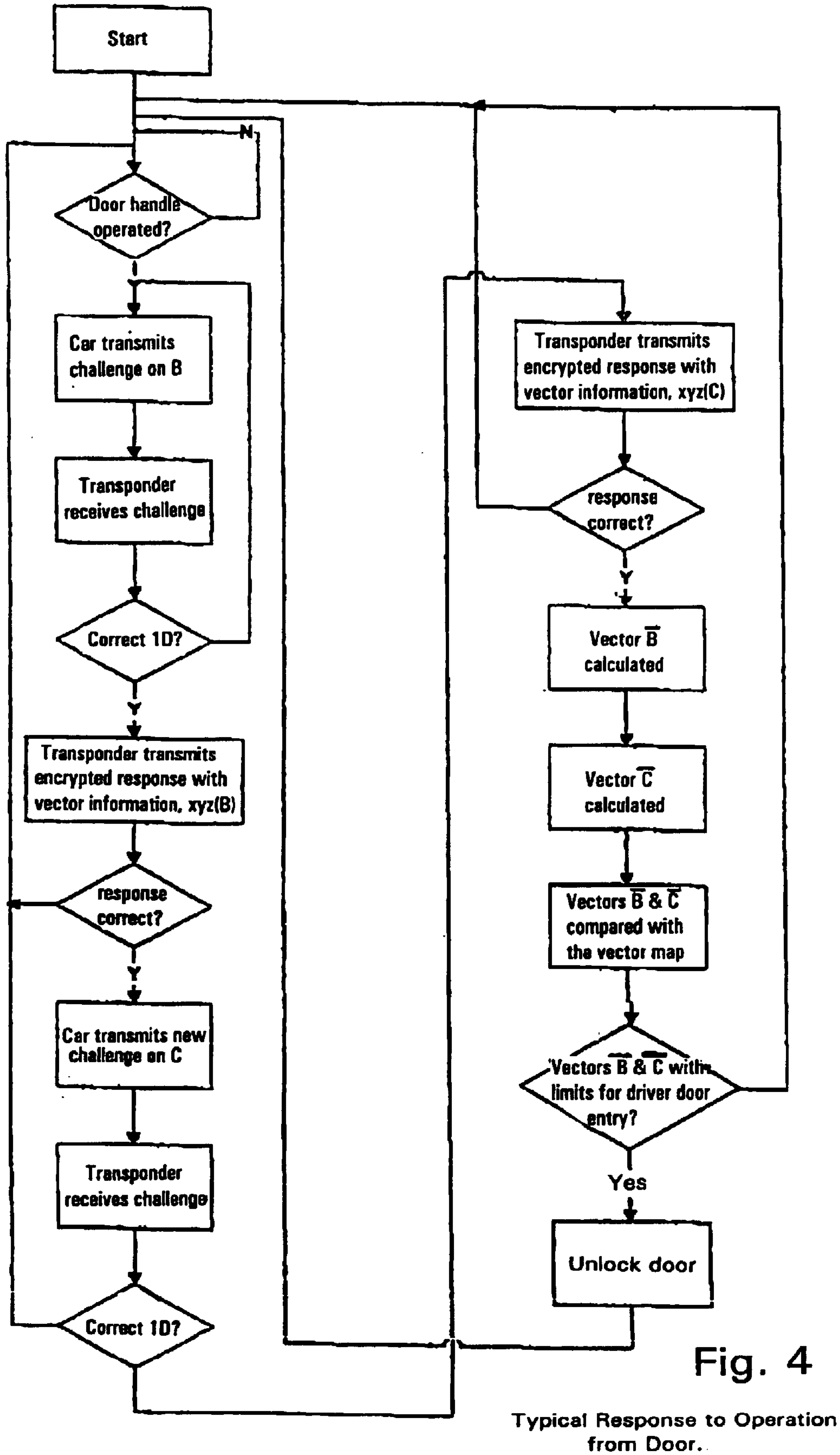
FIG. 4 is a flow chart of one aspect of the operation of the system of FIG. 1.

Referring to FIG. 4, an example of the operation of the system will now be described. If a user approaches the vehicle 10 and operates a door handle 22L, this initiates a challenge from the vehicle 10 on the coil B nearest the door 20L in question.

If the transponder 26 is not within range of the challenge signal it will not produce a response signal and the door will not be opened.

If the transponder 26 is within range and the identities of the vehicle 10 and the transponder 26 match, the transponder transmits back to the security controller 18 a signal in which is encrypted vector information $x_b$, $Y_b$, $z_b$.

The vehicle 10 then transmits the same or a different challenge on a different coil, e.g. coil C The process described above is repeated, such that the transponder 26 provides the vector information $x_c$,$y_c$, $z_c$ back to the security controller 18. Transmissions are made on as many of the coils as are required, either individually or in pairs as described above, for the relative angles and magnitudes of the vectors of the signals from the three coils A, B, C to be calculated. These relative angles and magnitudes are then compared with a vector map of the area in and around the vehicle to determine the position of the transponder. If the transponder 26 is within a predefined area near the door 20L, then the door is opened.

For a passive start application, it is preferred that the transponder 26 and the driver are both within the vehicle 10, not adjacent to it, before allowing the vehicle 10 to be started Use of the three orthogonal coils X, Y, Z in the transponder 26 and a vector map of the area in and around the vehicle allows the position of the transponder, and hence also the driver, to be determined with a high degree of certainty.

Figure 5:
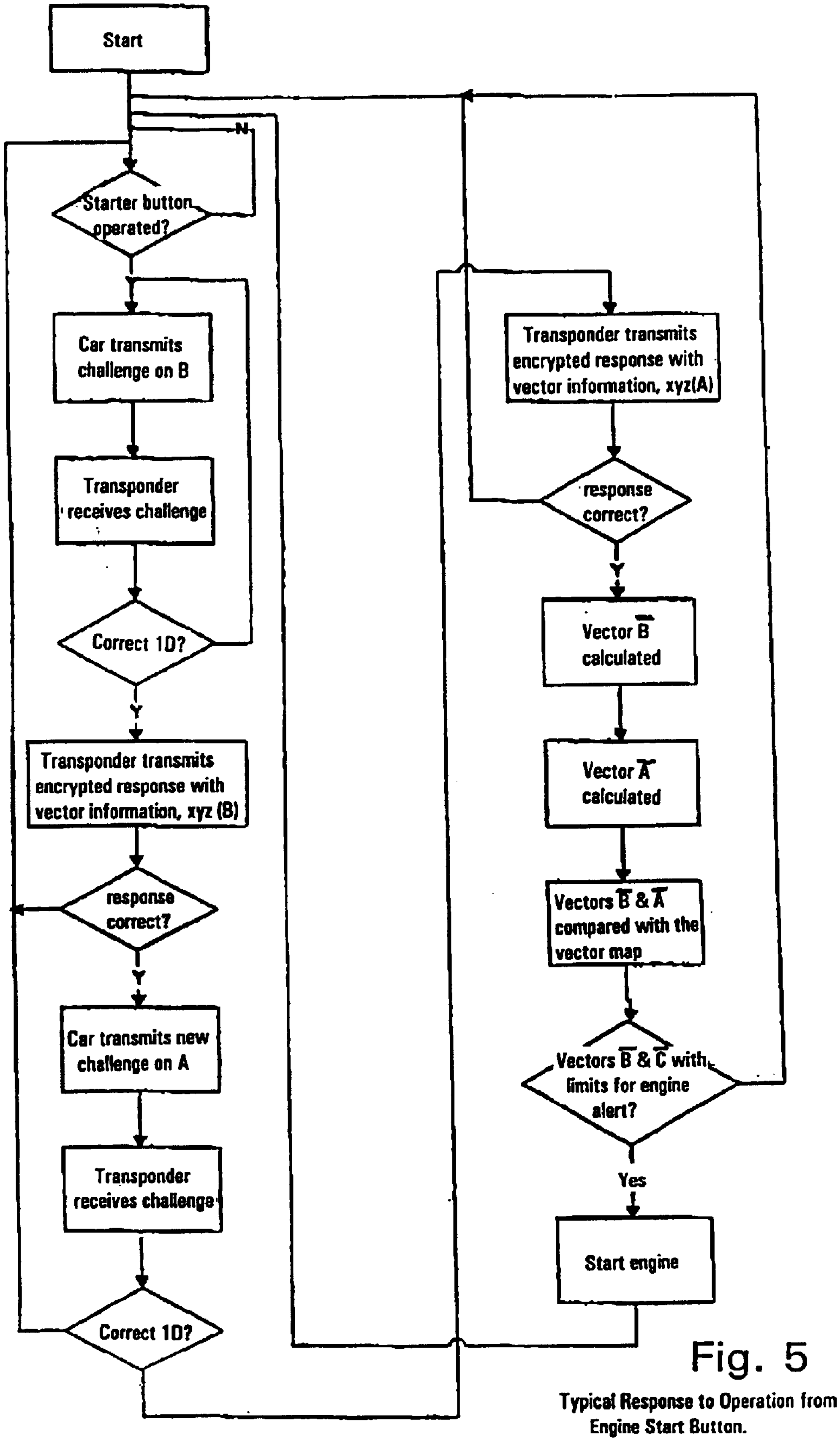
FIG. 5 is a flow chart of another aspect of the operation of the system of FIG. 1.

Referring to FIG. 5 an example of the process for passive start will be described. If a user has gained access to the vehicle 10 and wishes to start it, he presses the starter button 24, and a challenge signal is sent by the coil B nearest the button 24. If the transponder 26 is not within range then no response signal will be sent and the controller 18 will not allow starting of the vehicle. If the transponder 26 is within range and does receive the challenge, it transmits back to the security controller 18 a signal in which is encrypted vector information, e.g. $x_b$, $y_b$, $z_b$.

The vehicle 10 the challenge signal is then transmitted on all of the coils A, B, C both individually and in combination as required to determine the relative angles of the three coils, and the vector information is transmitted back to the controller 18 in encrypted form. The position of the transponder is then determined and provided it is within the vehicle, the vehicle is started. During this phase of passive remobilization, it may prove advantageous to additionally include further sensing arrangements, such as seat mounted weight sensing, for further security when starting the engine.

Two requirements for the coils X, Y, Z may create problems. Firstly, in the interests of sensitivity, the Q of the receiver coils X, Y, Z will be high and this might lead to variations in signal response. Secondly, to produce a preferred transponder 26 in the form of a flat "credit card"/ "smart card" transponder, one of the transponder coils X, Y, Z may need to be a low profile type, also potentially leading to a varying sensitivity.

Figure 6:
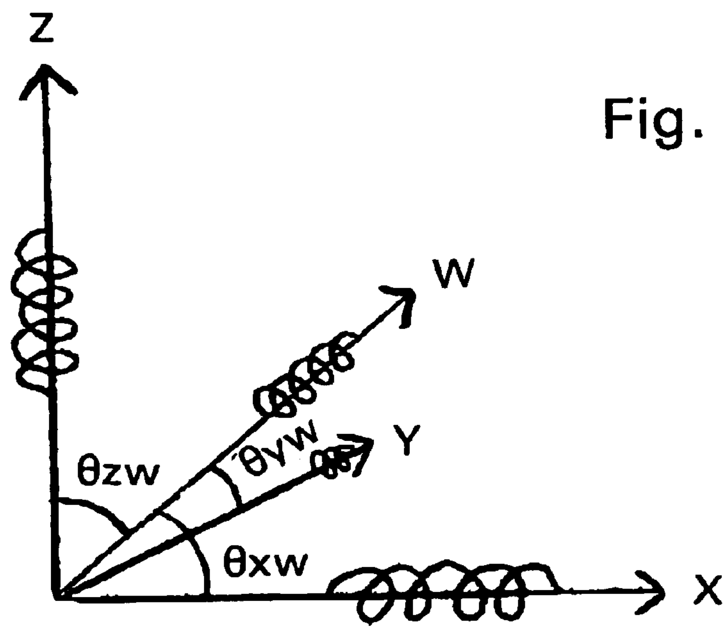
FIG. 6 shows the coils making up a transponder forming part of a second embodiment of the invention.

Therefore, it is desirable to include a self-calibration function in the transponder 26. This can be achieved by adding a fourth coil W as shown in FIG. 6 which is equally spaced in angle between the other three X, Y, Z and can be used to inject a signal into the three receiver coils X, Y, Z and allow them to be calibrated. Because the angles $\theta_{xw}$ $\theta_{yw}$ $\theta_{zw}$ between the calibration coil W and the other coils X, Y, Z are known, the sensitivities of the three coils X, Y, Z can be determined by measuring their response to a single signal transmitted by coil W. This calibration can be either used to preprocess the signals x, y & z before transmission from the transponder 26 or transmitted in the encrypted response RS for use by the security controller 18 to normalise the signals. The calibration coil W can also be used to compensate for any slight differences in the tuning of the transponder coils X, Y, Z. To do this it is arranged to transmit signals of different frequencies closely spaced around the nominal frequency of the coils, and the responses of the coils X, Y, Z measured. Any differences between the responses of the coils X, Y, Z at the frequency of the challenge signal can then be compensated for in the measurement of the field vector components.

The transponder coil assembly X, Y, Z may, for example, be embedded in a plastic or epoxy material with transponder logic circuits. This would have the advantage of excluding casual inspection or monitoring of the signals by a hacker.

The embodiment described so far relates to a system where the vehicle coils A, B, C transmit at a nominal 125 kHz and the transponder 26 responds at 434 MHz. Clearly, the related 315, 868 and 900 etc bands can be used. It may be found desirable to use other frequencies for the communication from the vehicle 10. For example, the use of 13.56 MHz would allow a lower power transmission and a greater range. The transponder coils X, Y, Z could be changed in scale and possibly also in structure, to accommodate the change. Equally, the use of 434 MHz in both directions may allow for some cost reduction in the transponder 26 due to the commonisation of the frequencies.

Figure 7:
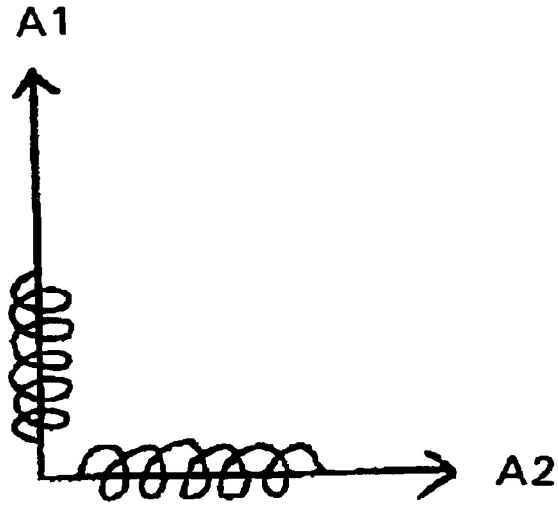
FIG. 7 shows a pair of transmitter coils forming part of a third embodiment of the invention.

Referring to FIG. 7, it is also possible to introduce a further degree of difficulty into a hacker's task by replacing the transmitter coil A with a pair of coils A1, A2 at mutually orthogonal orientations. The other two coils B and C would similarly be replaced by to orthogonal coils. The field produced by each of the coil pairs A, B and C can then be rotated by varying the relative strengths of the signals from the two coils in the pair. This means that during the transmission of a challenge signal, which will generally be in the form of a number of bits, the direction of the field can be varied, for example by simply switching between coils for subsequent bits, or by combining signals from the two coils to provide a combined field the direction of which can then be rotated in a more complex manner over a range of angles by varying the relative strengths of the two signals. The changes in direction of the field can then be detected by the transponder and used as the vector information which is relayed back to the controller 18 and checked before allowing access to, or starting of, the vehicle. Indeed this approach can be used with only one pair of coils at a single location on the vehicle. In this case the field may still vary with position, and may therefore be used to give some degree of checking on the position of the transponder, and this combined with the complication for a hacker of detecting, and relaying information about, the vector quantities of the signal can provide sufficient security for some applications. It also has the advantage of reduced cost compared with a system having a number of transmitters located around the vehicle.

In a further modification to this technique it will be appreciated that signals from the separate coils A, B and C, if transmitted simultaneously, will combine to form a field the direction of which is dependent on which of the coils A, B or C or which combinations of two or all three of them are transmitting. Again this means that the direction of the field at any point round the vehicle can be varied with time by varying the relative strengths of the signals from the coils A, B, C, and this variation used as at least part of the relevant vector information. Therefore as described above, the field direction can be modified in a predetermined manner on a bit by bit basis as a code modulation. The transponder 26 can be set up only to respond to a correct code in this modulation, or to relay the modulation information back to the controller for checking before access to the vehicle is allowed.

Hall effect sensors could be used instead of transponder coils X, Y, Z. If using a Hall effect sensor for measurement of the direction of the magnetic fields, then data can also be sent without a carrier frequency. Use of a DC field as the challenge signal would save the need to generate and condition AC signals. Furthermore, Hall effect transducers lend themselves better to integration in "smart card" structures than do coils.

In a further embodiment of the invention the transmitter coils A, B, C are arranged to transmit at much higher frequencies in the GHz waveband. At these frequencies the signals in the area in and around the vehicle will no longer be in the near field region, but will instead be in the far field region. This means that they will be propagating as electromagnetic radiation, and the direction of the electric and magnetic fields will be perpendicular to the direction of travel of the radiation, which in turn will be in a straight line away from the transmitting coil. Therefore the relative angles of the various transmitters from the transponder can be measured directly by measuring the differences in angle between the fields of the signals from the transmitters. Also at these frequencies the same frequency can be used for the challenge signal and the response signal allowing for some cost reduction in the transponder unit.

What is claimed is:

1. A security system for a protected object, the system comprising a security controller and a plurality of signal transmitters associated with the protected object, and a portable transponder, arranged in use to receive a challenge signal, from said transmitters and to transmit in response signal in response thereto, wherein the challange signal comprises vector information relating to the direction of a magnetic field generated by each of said transmitters and wherein comparator means are provided for carrying out a comparison between said vector information and a vector map of an area associated with the protected object to determine the position of the transponder in relation to the protected object and wherein the security controller is arranged to perform a security function depending on the comparison.

2. The security system according to claim 1, wherein the vector information comprises the relative directions of at least a component of the signals from the respective transmitters.

3. The security system according to claim 1, wherein the vector information comprises the relative strengths of at least a component of the signals form the respective transmitters.

4. The security system according to claim 1, wherein the transponder is arranged to relay said vector information to the security controller and the security controller is arranged to determine from the vector information the position of the transponder in relation to the protected object.

5. The security system according to claim 1, wherein the transponder is arranged to determine from the vector information its position in relation to the protected object and to vary its response accordingly.

6. The security system according to claim 1, wherein the transmitters are arranged in groups, each group comprising at least two transmitters (A1, A2) located substantially together in different orientations.

7. The security system according to claim 1, wherein the challenge signal comprises a plurality of components from different transmitters and the relative strengths of the components within the signal is arranged to vary with time during transmission of the challenge signal.

8. The signal system according to claim 1, wherein the transponder comprises a plurality of sensors arranged to detect different components of the challenge signal.

9. The security system according to claim 8, wherein said components are substantially mutually orthogonal.

10. The security system according to claim 8, wherein the transponder further comprises a calibration transmitter arranged to transmit a signal at a known orientation relative to said sensors so as to enable calibration of the sensors.

11. The security system according to claim 1, wherein the object is a vehicle and the security function comprises allowing access to the vehicle.

12. The security system according to claim 11, further comprising a plurality of sensors each associated with respective closure of the vehicle, the security controller is arranged to issue the challenge signal is response to an attempt by a user to open one of the closures.

13. The system according to claim 1, wherein the object is a vehicle and the security function comprises enabling the vehicle to start.

14. A security system for a protected object, the security system comprising:

a plurality of signal transmitters and a security controller associated with the protected object, the security controller directing the transmitters to transmit a plurality of corresponding challenge signals, and a portable transponder, including a plurality of orthogonally oriented and directionally sensitive sensors for receiving each of the challenge signals and detecting a corresponding plurality of vector components of each challenge signal, the transponder operating in response to each challenge signal for extracting the vector components of the challenge signal and transmitting the vector components of each challenge signal to the security controller in a corresponding response signal, the security controller being response to each response signal for determining a corresponding vector between the transponder and the signal transmitter of the corresponding challenge signal, and determining from the vectors the position of the transponder with respect to the signal transmitters.

15. The security system according to claim 14, wherein the vector components comprise the relative strengths of the challenge signals along a plurality of axes defined by the orthogonally oriented sensors.

16. The security system according to claim 14, wherein the transmitters are arranged in groups, each group comprising at least two transmitters (A1, A2) located substantially together in different orientations.

17. The security system according to claim 14, wherein the challenge signal comprises a plurality of components from different transmitters and the relative strengths of the components within the signal is arranged to vary with time during transmission of the challenge signal.

18. The security system according to claim 14, wherein the transponder further comprises a calibration transmitter arranged to transmit a signal at a known orientation relative to said sensors so as to enable calibration of the sensors.

19. The security system according to claim 14, wherein the object is a vehicle and the security function comprises allowing access to the vehicle.

20. The security system according to claim 14 further comprising a plurality of sensors each associated with respective closure of the vehicle, the security controller is arranged to issue the challenge signal is response to an attempt by a user to open one of the closures.

21. The system according to claim 14, wherein the object is a vehicle and the security function comprises enabling the vehicle to start.

* * * * *